OR 4,040,721
550/333

United States

Kurita

4,040,721

Aug. 9, 1977

[54] DRIVER CIRCUIT FOR LIQUID CRYSTAL DISPLAY

[75] Inventor: Masakatsu Kurita, Nagaokakyo, Japan

[73] Assignee: Omron Tateisi Electronics Co., Kyoto, Japan

[21] Appl. No.: 595,661

[22] Filed: July 14, 1975

[51] Int. Cl.[2] .................................................. G02F 1/28

[52] U.S. Cl. .............................. 350/160 LC; 340/336

[58] Field of Search .................. 350/160 LC; 340/336

[56] References Cited

U.S. PATENT DOCUMENTS

| | | | |
|---|---|---|---|
| 3,809,458 | 5/1974 | Heuner et al. | 350/160 LC |
| 3,891,306 | 6/1975 | Mitomo et al. | 350/160 LC |
| 3,911,421 | 10/1975 | Alt et al. | 350/160 LC X |
| 3,936,676 | 2/1976 | Fujita | 350/160 LC X |
| 3,938,136 | 2/1976 | Kawakami | 350/160 LC X |

*Primary Examiner*—John K. Corbin

*Assistant Examiner*—Rolf Hille

*Attorney, Agent, or Firm*—Flehr, Hohbach, Test, Albritton & Herbert

[57] ABSTRACT

A driver circuit connected to digit and segment electrodes on a liquid crystal display for providing saturating display voltages therebetween for "on" selected segments and sub-threshold voltages therebetween for "off" selected segments. Saturating voltages are obtained by applying an enabling signal to a digit electrode and an actuating signal to a segment electrode in a digit simultaneously. Sub-threshold voltages are obtained by applying quiescent signals to one or both digit and segment electrodes in the digit. An AC signal controllable in amplitude and frequency is utilized as the actuating signal applied to the selected segment electrode. Means are provided in the driving circuit for an initial adjustment of digit enabling and quiescent voltages as well as segment quiescent and actuating voltages.

15 Claims, 12 Drawing Figures

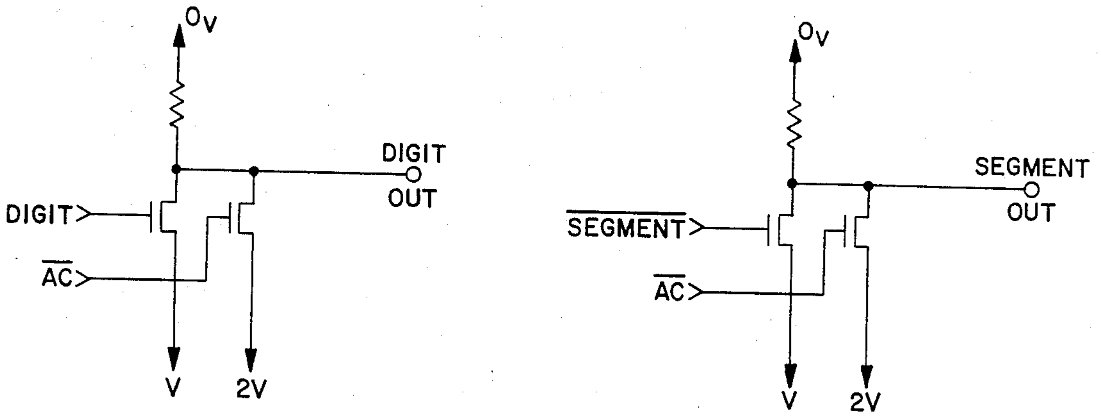
FIG.-1 OLD ART
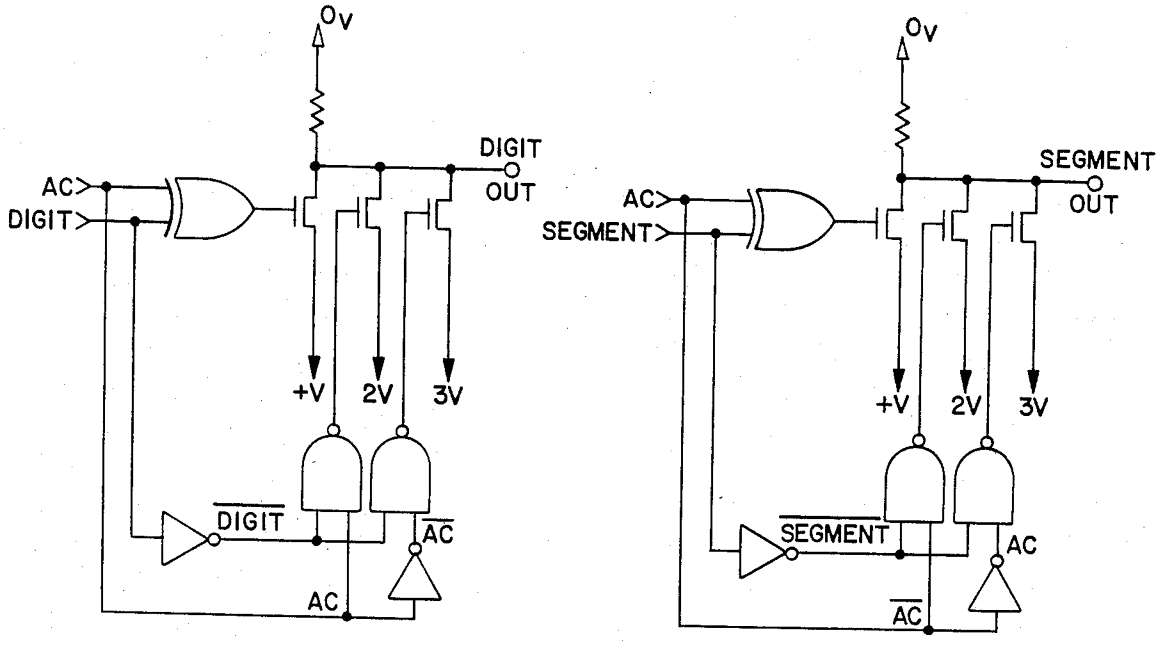
FIG.-2 OLD ART

T
T1
T2
T3
T4
T5
SA
0
VSELECT
VDI
V1
V4
0
V3
VSA
0
V2
V1-V2
V4-V2
VDISA
0
V4-V3

SA
0
VSELECT
VDI
V1
V4
0
V3
VSA
0
V2
V4-V2
VDISA
0
V1-V3
V4-V3

DRIVER CIRCUIT FOR LIQUID CRYSTAL DISPLAY

BACKGROUND OF THE INVENTION

A drive circuit is provided for energizing liquid crystal displays and more particularly for providing a multiple digit liquid crystal display having a high operation margin.

Liquid crystal displays generally include a plurality of digits each including a plurality of segments. The segments are selectively energized in each digit to display a composite number or symbol. Prior liquid crystal displays have utilized driving means for applying constant voltage levels between electrodes for each selected segment and each number or symbol and controlling the voltage on or off to actuate selected segments. This scheme requires driver circuitry which is relatively expensive because of the large number of circuit paths including driver components required to individually control each segment in each digit. Alternatively AC power has been utilized to obtain display voltage levels between digit electrodes and selected segment electrodes, wherein like segment electrodes in different digits are energized simultaneously to reduce required segment driver circuit components. A problem arises in the latter type of scheme inasmuch as nonselected common segments in adjacent digits may appear in "ghost" display if sufficient segment electrode voltage is applied to obtain optimum contrast at selected segments in the display. Moreover, once optimum contrast is obtained it has been found difficult to maintain source regulation sufficiently fine to retain optimum contrast over the entire range of display excitation conditions. There is, therefore, a need for a liquid crystal display combining high operation margin, high contrast, low ghost characteristics and lack of complexity in the segment driver portion of the driver circuit.

OBJECTS AND SUMMARY OF THE INVENTION

The disclosed driver circuit for a liquid crystal display is adapted to receive decoded segment and digit drive signals for determining the application of electrical potential between predetermined segment and digit electrodes with liquid crystal material disposed between the electrodes. The liquid crystal material has the characteristics of providing maximum contrast between portions of the liquid crystal subjected to high level electric fields and adjacent portions and for providing no contrast between portions of the liquid crystal subjected to a low level electric field and adjacent portions. The RMS or effective value of a voltage producing the electric field provides a saturated liquid crystal above a saturation voltage and an unexcited liquid crystal below a threshold voltage. The RMS value of the saturating and the threshold voltages is provided in a driver circuit, wherein like segments in each digit of the display are common, by providing for a quiescent digit electrode voltage for nonselected digits and an enabling digit electrode voltage for selected digits. A quiescent voltage is also provided for nonselected segments and an actuating voltage is provided for selected segments which voltages are applied to like segments in each digit simultaneously. Actuating signal amplitude and frequency is adjustable. Adjustment of amplitude provides an effective value of the electrical potential between digit and segment electrodes which is above the saturation voltage at selected segments in selected digits and below the threshold voltage at like segments in nonselected digits. Adjustment of frequency provides particular saturation and threshold voltage levels for a particular liquid crystal element, since these voltage levels are a function of the particular liquid crystal element impedance. Digit quiescent voltage level is selected to provide subthreshold voltages between digit and nonselected segment electrodes, whether segment quiescent or actuating voltages are present.

In general it is an object of the present invention to provide a driver circuit for a liquid crystal display having a high operation margin and multiple digits.

It is another object of the present invention to provide a driver circuit for a liquid crystal display in which the RMS value of the digit-segment electrode voltage is controlled for producing the display.

It is another object of the present invention to provide a driver circuit for a liquid crystal display in which the display capacitance is utilized to obtain high operation margin.

It is another object of the present invention to provide a driver circuit for a liquid crystal display utilizing independently adjustable quiescent and enabling and actuating voltages on display electrodes for obtaining subthreshold and super-saturated RMS display voltages.

It is another object of the present invention to provide a driver circuit for a liquid crystal display combining high operation margin with relaxed source regulation requirements in a circuit requiring minimum driver components.

Additional objects and features of the invention will appear from the following description in which the preferred embodiments have been set forth in detail in conjunction with the accompanying drawings.

BRIEF DESCRIPTION OF THE DRAWINGS

FIG. 1 is a schematic diagram of a liquid crystal display driver circuit old in the art.

FIG. 2 is a schematic diagram of another liquid crystal display driver circuit old in the art.

DESCRIPTION OF THE PREFERRED EMBODIMENTS

Figure 3:
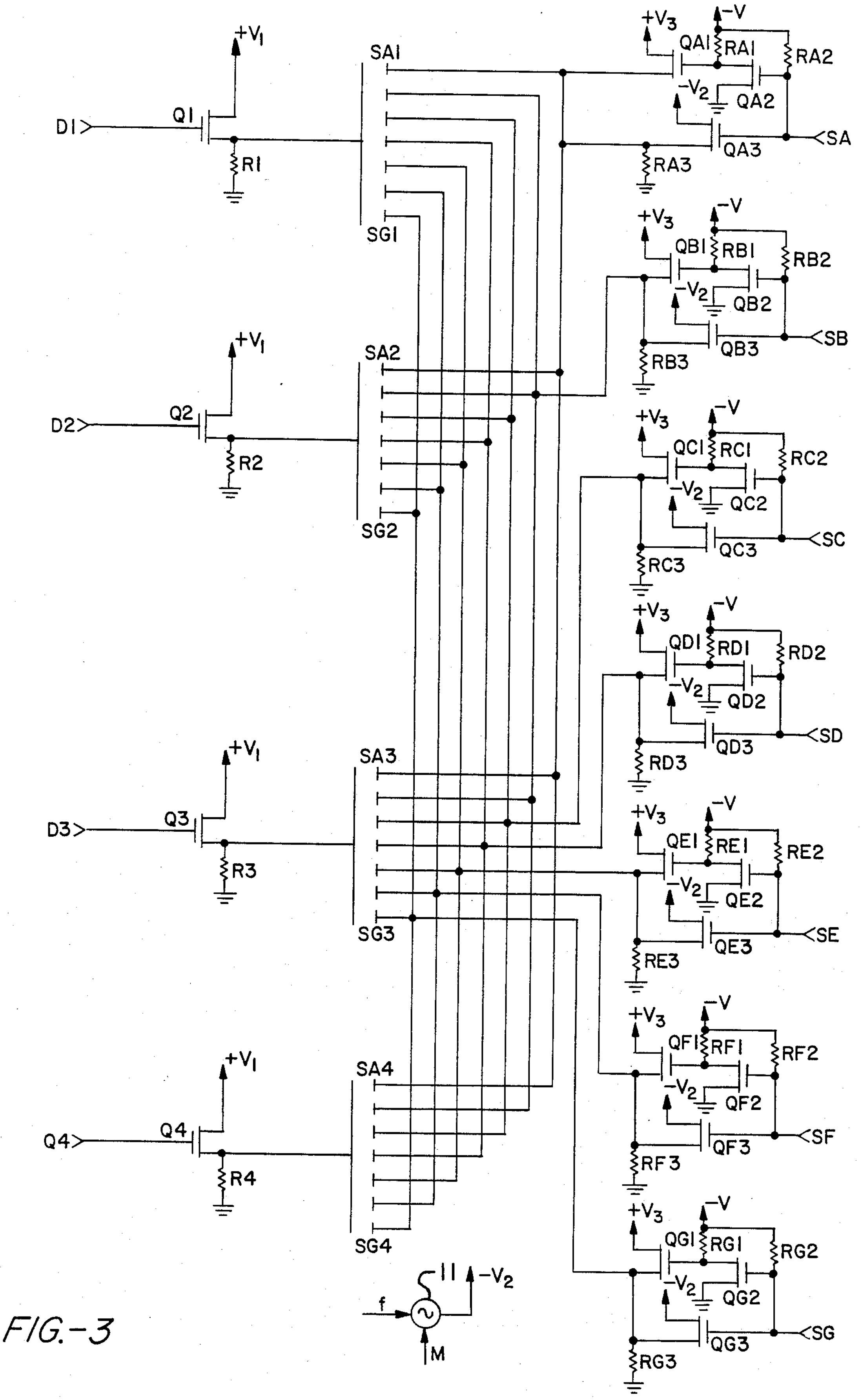
FIG. 3 is a schematic diagram of one embodiment of the disclosed liquid crystal display driver circuit.

The driver circuit disclosed herein is for a liquid crystal display having a plurality of digits which are sequentially enabled in multiplexed fashion once each multiplex cycle by decoded digit signals connected to the digit inputs of the liquid crystal display driver circuit. The display is of the type having a plurality of segments arranged positionally in each digit for providing a variety of predetermined numerals and/or symbols as desired. Like segments in each of the plurality of digits are connected together for receiving decoded segment signals at the segment inputs to the driver circuits. Digit and segment electrodes are provided having liquid crystal material disposed therebetween which has the known characteristics associated therewith for providing a maximum contrast display for RMS voltages on the electrodes above the saturation voltage and no contrast in the display for RMS voltages on the electrodes below a threshold voltage. The liquid crystal display, by virtue of its construction, including digit and segment electrodes as capacitor plates and liquid crystal material therebetween as dielectric, has certain capacitive characteristics. These characteristics may be controlled to assume predetermined values by structural fabrication in accordance with predetermined physical dimensions for the structure of the liquid crystal display.

Known circuits are available for altering the voltage levels applied to digit and segment electrodes so that potential difference therebetween of predetermined polarity will cause selected segment in the display to produce visual contrast with surrounding areas in the display. Such a driver circuit is seen in FIG. 1, which is known as the ½ biasing method for driving liquid crystal displays. The circuit of FIG. 1 utilizes two voltage levels relative to a zero or reference voltage level for selective application to the digit and segment electrodes. The circuit of FIG. 1 is not overly complex, but it suffers the deficiency of being unable to handle more than two, or at the most three, digits in a display without placing such a load on the source of energy as to create severe source regulation problems.

FIG. 2 is another driver circuit old in the art, known as the ⅓ biasing method, which partially overcomes the regulation deficiency of the circuit of FIG. 1, but is obviously very complex in comparison.

The complexity of the driver circuit of FIG. 2 and the regulation problems of the driver circuit of FIG. 1 may be overcome simultaneously through the use of the disclosed invention. Prior to entering a discussion of the disclosed invention, a term of art, operation margin, wll be defind. Operation margin is known in the field and is defined as hereinafter used as the ratio of the RMS voltage between digit and segment electrodes for providing an ON or visual contrast in the display, to the RMS voltage between digit and segment electrodes for providing an OFF or no contrast display. The RMS ON value if electrical potential between a digit and a segment electrode is that RMS value of voltage waveform therebetween during one digit multiplexing cycle during which the segment is selected to be displayed. The RMS OFF value is that RMS value of the electrical potential waveform between a digit and a segment electrode during one digit multiplexing cycle during which the segment is not selcted to be displayed. As described above, operation margin is the ratio of RMS ON to RMS OFF.

Figure 5:
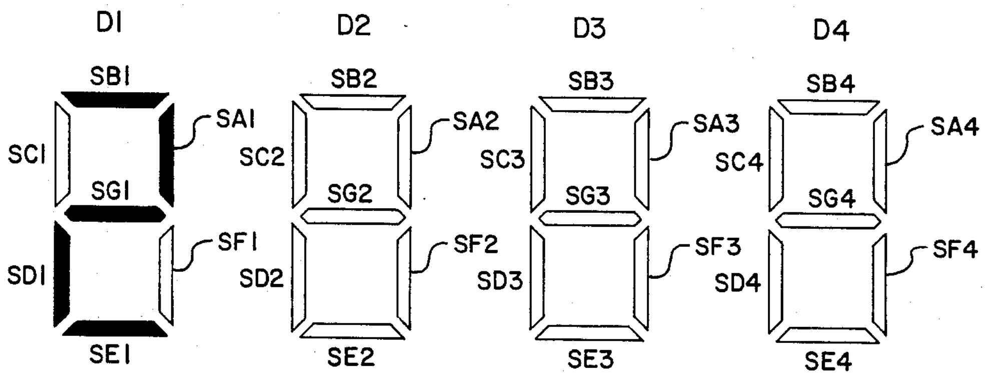
FIG. 5 is a plan view of a typical digital display.

Reference is briefly made to FIG. 5 in which is shown a plan view of a liquid crystal display suitable for electronic watches, calculators and the like, and which includes four numerals or symbols designated D1 through D4. It is understood that the present invention can be applied to displays including a larger or smaller number of digits. The digits each include seven segments for illustration purposes only, which are designated SA1 through SG1 in each digit as shown in FIG. 5. The energized segments shown therein in shaded form in digit 1, would be identified as SB1, SA1, SG1, SD1, and SE1, and would describe the numeral 2.

With the designations recited above for FIG. 5 in mind, attention is now drawn to the electrical schematic of FIG. 3. Four digit input terminals D1 through D4 are shown for receiving decoded digit drive signals. Seven segment electrode input terminals are shown SA through SG for receiving decoded segment drive signals. All of the A segments, SA1 through SA4, are seen to be together in common electrical connection. The A segments are connected to that portion of the driver circuit which receives the decoded A segment drive signal, SA. Each of the segment drive circuits is identical, and remarks made in the description of the segment A drive circuit apply with equal force to each of the segments B through G drive circuits shown in FIG. 3.

Input terminal SA is available for receiving a segment decoded drive signals and is connected to the gate of a field effect transistor QA3. The drain of QA3 is connected to an actuating signal −V2. Actuating signal −V2 is shown as being derived from an acutating voltage source 11, and is represented as being adjustable in either frequency, *f*, or magnitude, M, or both. The source of QA3 is referenced to a ground potential through a resistor RA3. The source of QA3 is also connected to like segments in each digit, in this case the A segments SA1 through SA4. Another field effect transistor QA1 is shown having a source connected to a segment quiescent voltage +V3 and a drain connected to like A segments SA1 through SA4. An additional field effect transistor QA2 has its gate connected to terminal SA for receiving decoded segment drive signals. The source of QA2 is connected to groundpotential, and the drain of QA2 is connected to the gate of field effect transistor QA1. The gate of field effect transistor QA1 is also connected through resistor RA1 to a voltage −V. −V is also connected through a resistor RA2 to the gate of field effect transistor QA2.

The segment drive circuit described immediately above operates as follows. In the absence of a decoded segment drive signal at segment input terminal SA, QA3 is off, QA2 is off, and −V at the gate of QA1 provides a low impedance path between the source and gate of QA1. Therefore quiescent voltage +V3 is on segment electrodes SA1 through SA4. Upon the arrival of a decoded segment drive signal at terminal SA, QA3, and QA2 are turned on thereby reducing the impedance between source and drain in each of these field effect transistors. It may be seen that the gate of QA1 is thereby placed at ground potential, thus imposing a high impedance between source and drain of QA1 which is the off condition. +V3, the segment quiescent voltage is thereby removed from all segments A. Simultaneously actuating signal −V2 is presented to all segments A. As soon as the decoded segment drive signal is removed from segment input terminal SA, field effect transistors QA2 and QA3 return to a condition providing high impedance between source and drain, or the off condition, and QA1 is turned on, reapplying quiescent voltage +V3 to all like segments A.

Continuing with the description of the circuit diagram of FIG. 3 digit input electrodes D1 through D4 are seen to be connected to the gate of field effect transistors Q1 through Q4. All digit electrode drive circuits being identical, the digit drive circuit for digit D1 only will be described, the description applying to digit drive circuits for D2 through D4 as well. The input terminal D1 to digit drive circuit for digit 1 is seen connected to the gate of a field effect transistor Q1. The source of field effect transistor Q1 is connected to a digit enabling signal +V1 and the drain of Q1 is connected through resistor R1 to ground potential. In the absence of a decoded digit drive signal at digit drive circuit input D1, field effect transistor Q1 provides a high impedance between source and drain of Q1 thereby placing the electrode of digit D1 at a quiescent voltage determined by resistor R1. When a decoded digit drive signal is applied to terminal D1, impedance between source and drain of field effect transistor Q1 is lowered to thereby place the enabling signal +V1 on the digit electrode of digit D1.

It may be seen from the above description that in the absence of decoded segment and digit drive signals the quiescent voltages from the ground potential and +V3 are applied to digit and segment electrodes respectively. When a decoded digit drive signal is applied to a digit electrode and quiescent voltage +V3 is applied to an opposing segment electrode the voltage of V1 -V3 is seen therebetween. In the absence of a decoded digit drive signal and when a decoded segment drive signal is applied to a selected segment, a potential exists between digit and segment electrode of approximately V2. When both decoded segment and digit drive signals are present a potential exists between digit electrode and selected segment electrodes equivalent to V1 + V2. It is apparent therefore, that during one multiplex cycle a potential exists between a digit electrode and a segment electrode which is determined by the quiescent digit and segment voltages, which are near a ground potential and +V3 respectively in FIG. 3, and the digit enabling voltage +V1 and the segment actuating voltage −V2.

Figure 4:
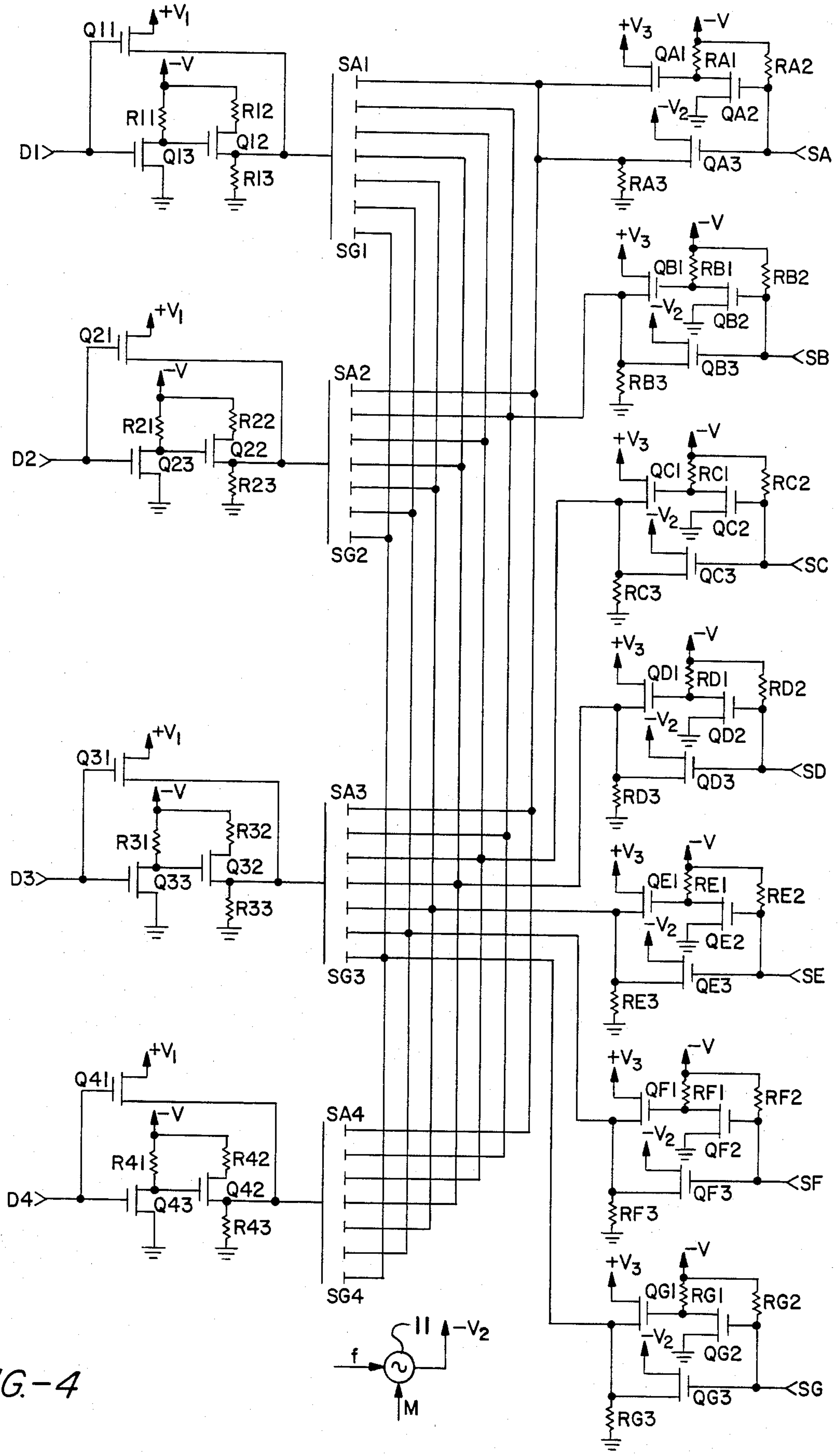
FIG. 4 is a schematic diagram of another embodiment of the disclosed liquid crystal display driver circuit.

Turning now to FIG. 4 an alternative embodiment is shown which differs from FIG. 3 only in the construction of the digit drive portion of the driver circuit. The digit drive for digit D1 will be described, which is equally applicable for the digit drive circuits for digits D2 through D4 which are identical. Input terminal D1 is connected to the gates of field effect transistors Q11 and Q13. The source of field effect transistor Q11 is connected to digit enabling voltage +V1 as described above, and the drain of Q11 is connected to the digit electrode for digit D1. The source of field effect transistor Q13 is connected to ground potential and the drain is connected through resistor R11 to −V. The drain of Q13 is also connected to the gate of aother field effect transistor Q12. The source of Q12 is connected through a resistor R13 to ground potential, and the drain of Q12 is connected through a resistor R12 to −V. The source of Q12 is also connected to the digit electrode for digit D1.

The digit drive section in the driver circuit of FIG. 4 functions as follows. In the absence of a signal at digit input terminal D1 field effect transistor Q13 is in the off condition providing a high impedance between source and drain and thereby presenting −V at the gate of field effect transistor Q12. At the same time field effect transistor Q11 is also in the off condition, presenting a high impedance between source and drain. The voltage at digit electrode D1 in the absence of a decoded digit drive signal at terminal D1 is therefore dependent upon the impedance between source and drain at Q11, the level of +V1, the level of −V, the magnitude of R12 and the magnitude of R13.

When a decoded digit drive signal is received at input terminal D1 field effect transistors Q11 and Q13 are placed in an on condition, presenting a lowered impedance between their source and drain terminals. In this fashion Q13 places the gate of Q12 at ground potential, raising the impedance between the source and drain of Q12 and tending to isolate the digit electrode of digit D1 from −V. At the same time the impedance between source and drain of field effect transistor Q11 is lowered tending to move digit electrode D1 toward +V1 and applying an enabling voltage to digit electrode D1.

To summarize the descriptions of FIGS. 3 and 4 above, each circuit includes a digit driver for each digit in the display for the purpose of switching the digit electrodes between a quiescent voltage and an enabling voltage +V1. Each segment in each digit is in common connection with a like segment in each other digit. A segment driver is provided for each segment, as represented by QA3, for switching a segment actuating signal to a predetermined segment electrode in response to a decoded segment drive signal. The segment driver QA3 is also connected to field effect transistor QA1 for applying quiescent segment signal +V3 to a predetermined segment electrode in the absence of a decoded segment drive signal. Resistor RA3 may be used to adjust the amplitude of actuating signal −V2. Field effect transistor QA2 together with resistors RA1 and RA2 may be used to adjust the amplitude of the quiescent segment signal +V3 for application to segment electrodes. The magnitude of actuating voltage −V2 may be adjusted by selection of resistor RA3, or may be adjusted at source 11.

It may be seen from the foregoing that actuating voltage −V2 is applied to both ON segments in the digit being displayed during the digit multiplex cycle and to OFF segments in the other non-selected digits of the display, since like segments in each digit are common. Therefore −V2 must be selected through adjustment to provide above saturation voltage at displayed segments and below threshold voltage at segments in common which are not to be displayed. Adjustment of −V2 is also used to compensate for the manufacturing variation in saturation and threshold voltage observed between liquid crystal displays.

Figure 6:
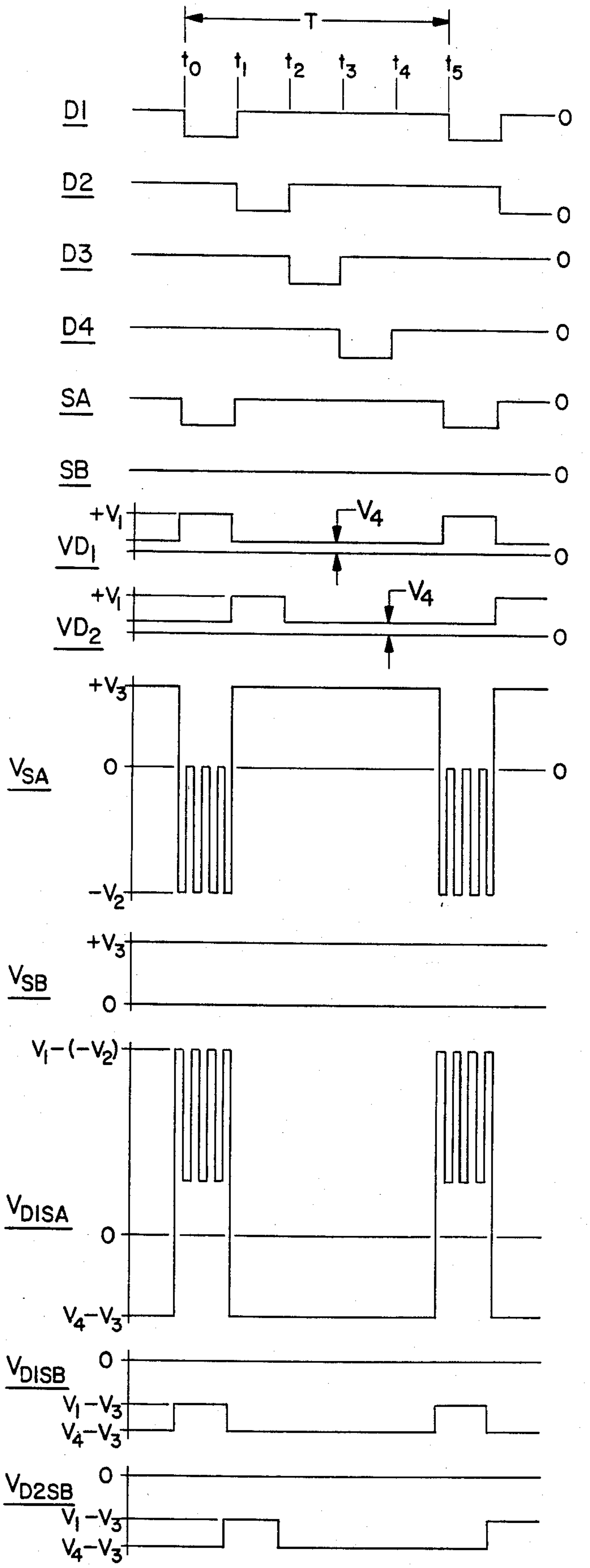
FIG. 6 is a timing chain showing one set of signals existing in the circuit of FIG. 4.

Turning now to FIG. 6 a timing chain is shown in which segment SA1 in digit D1 is on only. The digit multiplexing cycle has a period T which is divided into five segments $t_0$-$t_1$ through $t_4$-$t_5$ as shown. Digits D1 through D4 are enabled in sequence through time $t_4$ and $t_4$-$t_5$ is an unused portion of period T. As seen decoded digit drive signal D1 is present during period $t_0$-$t_1$ at the same time decoded segment drive signal SA is present. In this fashion +V1 is placed on digit electrode D1 as shown at VD1, and −V2 is placed on segment electrode SA1 as shown at VSA during the period $t_0$-$t_1$. The peak potential between digit electrode D1 and segment electrode SA1 is seen at VDISA as the difference between V1 and −V2. Since segment A only is to be energized in this example, the decoded segment drive signal for segment SB is presented together with the voltage on segment SB at VSB, which is shown as quiescent segment voltage V3. The signals present in digit 1 at segment SB and digit 2 segment SB are also shown in FIG. 6 as VD1SB and VD2SB respectively.

Figures 7A, 7B:
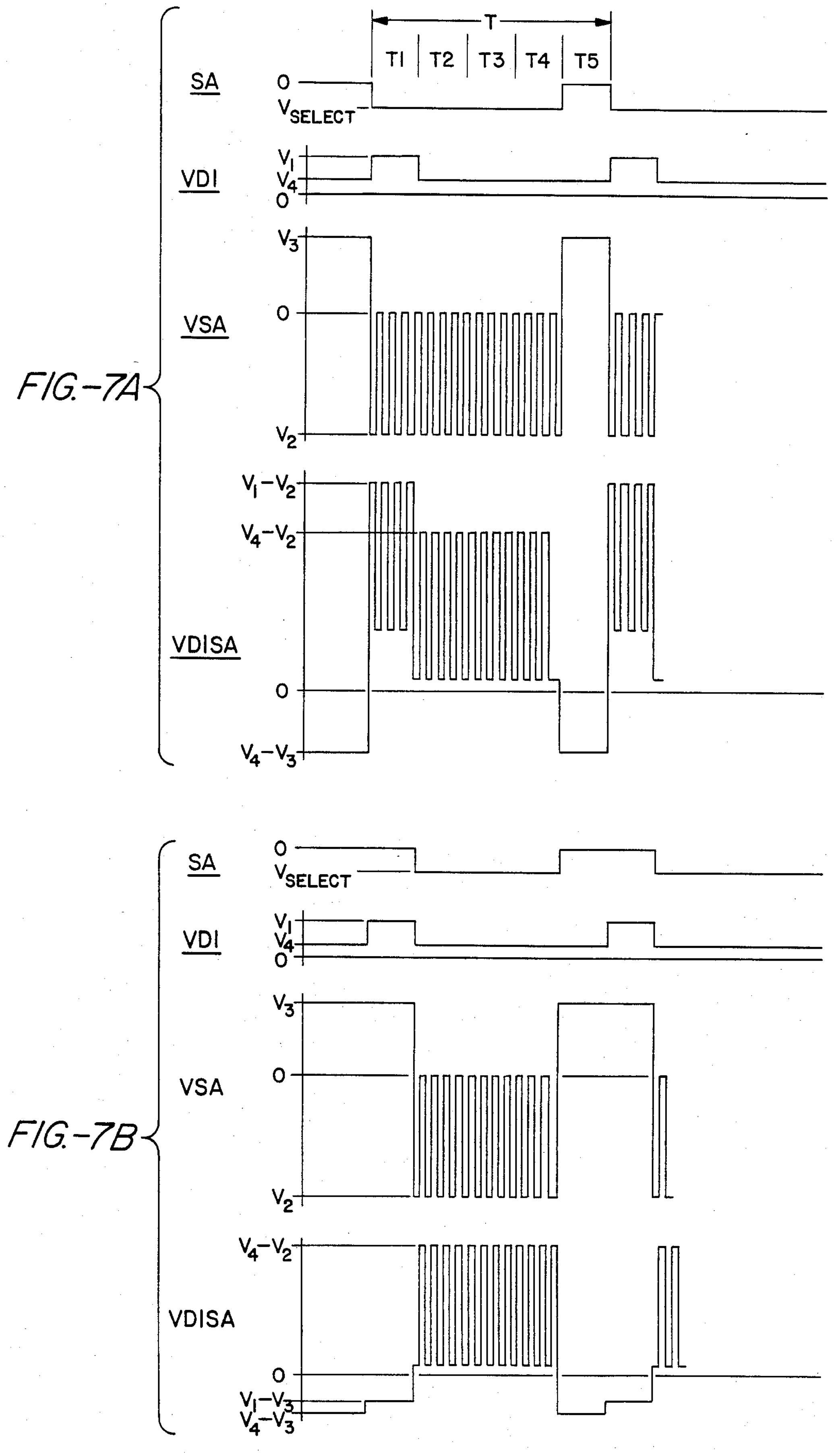
FIG. 7*a* is a timing chain showing another set of signals which may exist in the circuit of FIG. 4.
FIG. 7*b* is a timing chain showing an additional set of signals which may exist in the circuit of FIG. 4.

Turning now to FIG. 7A, a timing chain is presented similar to that shown in FIG. 6, in which segment A is selected on in all digits D1 through D4. The segment A decoded segment drive signal is therefore shown at SA as exending through periods T1 through T4 of digit multiplex cycle T. The remainder of FIG. 7A shows the voltage existing between digit electrode D1 and segment electrode SA1 for the entire digit multiplex cycle. Voltage at VD1 is shown as existing during period T1. Voltage V4 is a small voltage level and is adjusted as the digit quiescent voltage by means heretofore described. The voltage at segment A is shown at VSA, holding at −V2 for periods T1 through T4. The voltage between digit electrode D1 and segment electrode SA1 is shown at VDISA, reaching V1−V2 for the period T1 and falling to V4−V2 for the periods T2 through T4, and returning to the quiescent values VA−V3 for the period V5.

Referring to FIG. 7B, a timing chain is presented showing a condition where segment A in digit D1 is off and segment A in digits D2 through D4 is on. Decoded segment drive signal is shown at SA as present for the periods T2 through T4. Digit drive signal is shown at VD1 as present during period T1. Segment A has quiescent voltage V3 applied during period T1 as seen at VSA. Segment A has actuating voltage −V2 applied during periods T2 through T4 as also seen at VSA. Consequently, the voltage between electrodes D1 and SA1 for one multiplexing cycle T is shown at VD1SA. Peak voltage is seen as V4−V2 which is the difference between the digit quiescent voltage and the segment actuating voltage. During period T1 the potential between digit D1 and segment SA1 is seen as the difference between the digit enabling voltage +V1 and the segment quiescent voltage V3.

Figure 8:
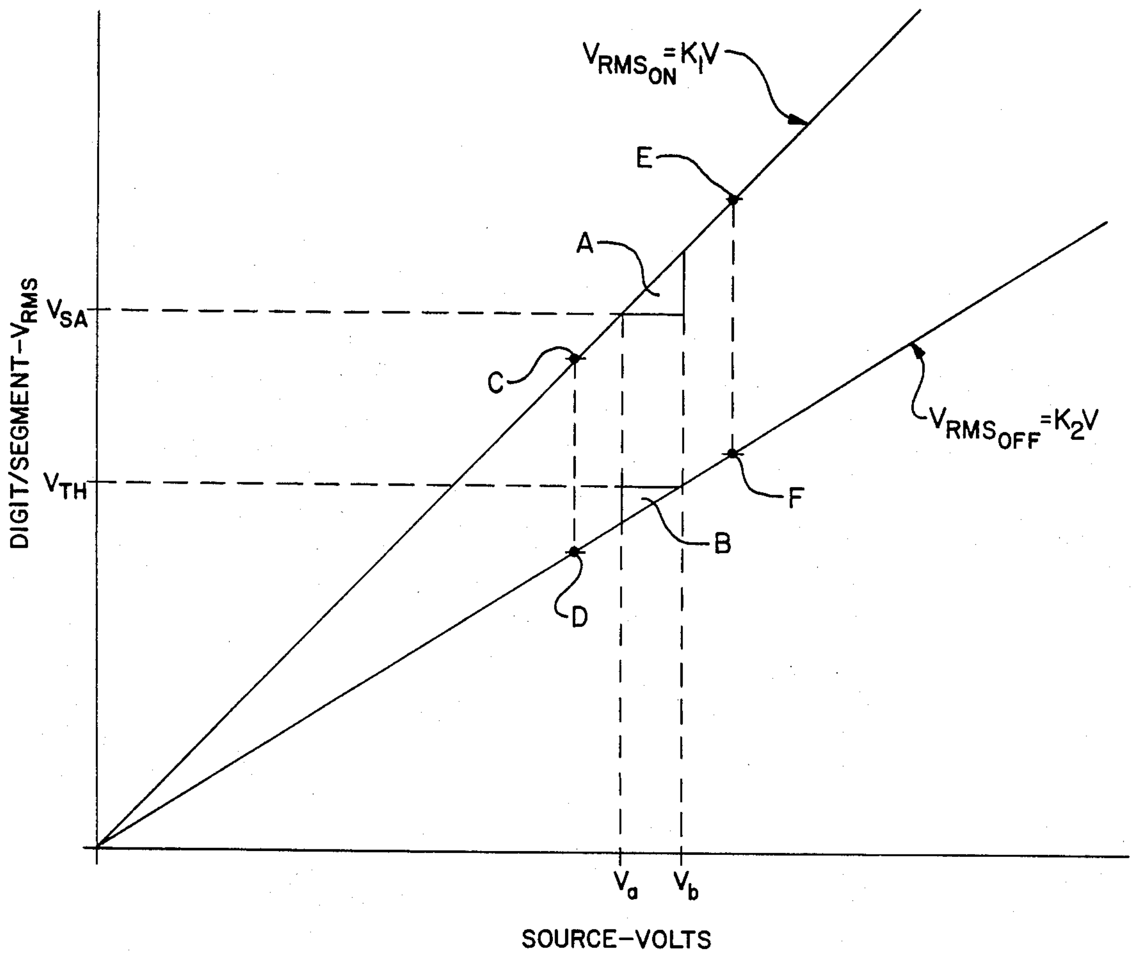
FIG. 8 is a chart showing the digit to segment RMS voltage as a function of source voltage.
Figure 9:
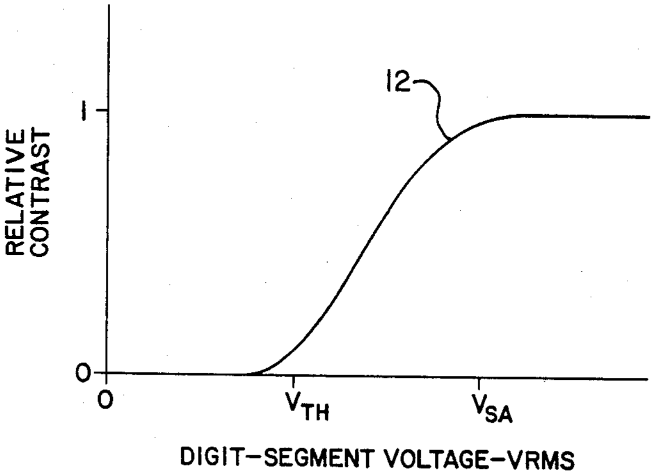
FIG. 9 is a chart showing relative contrast as a function of digit to segment volts RMS.

Keeping in mind that the root-mean-square of a curve, or the effective value described by the curve, is defined by relationship $$V_{RMS} = \sqrt{\frac{1}{T} \int_0^T v(t)^2 dt} ,$$

a convenient set of values may be assigned to the various voltage levels for illustrating the adjustment of these levels to obtain optimum operating characteristics. Referring to FIG. 9 the effect on relative contrast of the display may be seen in curve 12 which shows 0 relative display contrast at and below a threshold voltage $V_{TH}$, and unity relative display contrast at and above a saturation voltage $V_{SA}$. FIG. 8 shows the digit to segment VRMS as a function of source voltage. A curve $K_1V$ is drawn representing a VRMS ON voltage for a corresponding source voltage. Another curve $K_2V$ is drawn representing VRMS OFF voltage for a particular source voltage. $K_1$ may be seen to be greater than $K_2$. Threshold voltage $V_{TH}$ and saturation voltage $V_{SA}$ are shown intersecting $K_2V$ and $K_1V$ at $V_b$ and $V_a$ on the abscissa respectively. From the curve of FIG. 8 it may be deduced that optimum operation exists with a VRMS ON above $V_{SA}$ and a VRMS OFF below $V_{TH}$. Source voltage must therefore be regulated between the values $V_a$ and $V_b$. The optimum operation with the operation margin depicted in FIG. 8 by the curves $K_1V$ and $K_2V$, would be between points A and B for on and off displays respectively. Such operation would provide for maximum contrast in the on condition and zero contrast in the off condition. Operation between points C and D would provide for less than maximum contrast in the on condition and no contrast in the off condition. Operation between points E and F would provide for maximum contrast in the on condition and a small amount of contrast, or ghost, in the off condition.

FIG. 8 shows that larger operation margin provide for the optimum condition of operation between points A and B without imposing an overly restrictive source voltage regulation requirement. An example of the three operating conditions shown as points AB, CD and EF in FIG. 8 follows. If $V_{SA}$ is chosen as 4.8 VRMS and $V_{TH}$ is chosen as 3.5 VRMS the following combinations of convenient voltage levels will provide for display operation between the points indicated.

BEST CONTRAST, NO "GHOST": (POINTS A-B)

V1 = 6V
V2 = −5V
V3 = 3V
V4 = 0V

| | $VRMS_{ON}$ | $VRMS_{OFF}$ |
|---|---|---|
| VD1SA | ON | OFF |
| VD2SA | ON | ON |
| VD3SA | ON | ON |
| VD4SA | ON | ON |

$$VRMS_{ON} = \sqrt{\left[(V_1 - V_2)\sqrt{\frac{1}{2}\cdot\frac{1}{5}}\right]^2 + (V_1\sqrt{\frac{1}{2}\cdot\frac{1}{5}})^2 + (V_3\sqrt{\frac{1}{5}})^2 + (V_2\sqrt{\frac{1}{2}\cdot\frac{3}{5}})^2}$$

$VRMS_{ON} = 5$ (DI ELECTRODE TO SAI ELECTRODE FOR A MULTIPLEXING CYCLE.)

$$VRMS_{OFF} = \sqrt{(V_3\sqrt{\frac{1}{5}})^2 + \left[(V_3 - V_1)\sqrt{\frac{1}{5}}\right]^2 + (V_2\sqrt{\frac{1}{2}\cdot\frac{3}{5}})^2}$$

$VRMS_{OFF} = 3.33$

LOW CONTRAST, NO "GHOST": (POINTS C-D)

V1 = 6V
V2 = −4V
V3 = 3V
V4 = 0V

| $VRMS_{ON}$ | $VRMS_{OFF}$ |
|---|---|

-continued

| | | |
|---|---|---|
| VD1SA | ON | OFF |
| VD2SA | ON | ON |
| VD3SA | ON | ON |
| VD4SA | ON | ON |

$$VRMS_{ON} = \sqrt{\left[(V_1 - V_2)\sqrt{\frac{1}{2}\cdot\frac{1}{5}}\right]^2 + (V_1\sqrt{\frac{1}{2}\cdot\frac{1}{5}})^2 + (V_3\sqrt{\frac{1}{5}})^2 + (V_2\sqrt{\frac{1}{2}\cdot\frac{3}{5}})^2}$$

$VRMS_{ON} = 4.49$ $$VRMS_{OFF} = \sqrt{(V_3\sqrt{\frac{1}{5}})^2 + \left[(V_3 - V_1)\sqrt{\frac{1}{5}}\right]^2 + (V_2\sqrt{\frac{1}{2}\cdot\frac{3}{5}})^2}$$

$VRMS_{OFF} = 2.90$

HIGHCONTRAST, WITH "GHOST": (POINTS E-F)

$V_1 = 6V$
$V_2 = -6V$
$V_3 = 3V$
$V_4 = 0V$

| | $VRMS_{ON}$ | $VRMS_{OFF}$ |
|---|---|---|
| VD1SA | ON | OFF |
| VD2SA | ON | ON |
| VD3SA | ON | ON |
| VD4SA | ON | ON |

$$VRMS_{ON} = \sqrt{\left[(V_1 - V_2)\sqrt{\frac{1}{2}\cdot\frac{1}{5}}\right]^2 + (V_1\sqrt{\frac{1}{2}\cdot\frac{1}{5}})^2 + (V_3\sqrt{\frac{1}{5}})^2 + (V_2\sqrt{\frac{1}{2}\cdot\frac{3}{5}})^2}$$

$VRMS_{ON} = 5.53$ $$VRMS_{OFF} = \sqrt{(V_3\sqrt{\frac{1}{5}})^2 + \left[(V_3 - V_1)\sqrt{\frac{1}{5}}\right]^2 + (V_2\sqrt{\frac{1}{2}\cdot\frac{3}{5}})^2}$$

$VRMS_{OFF} = 3.80$

Reference to FIGS. 6, 7A and 7B show that waveforms for VD1SA, VD1SB and VD2SB are not symmetrical about the zero reference for the digit scan cycle having period T. This is a characteristic which is unique in the disclosed circuit. For example, this characteristic is not present in the waveforms produced through use of the old art circuits of FIGS. 1 and 2 for one half and one third biasing respectively. RMS or effective value of the waveforms obtained through the disclosed circuit for the period T is therefore dependent upon individual or combined values of V1 through V4.

Figure 11:
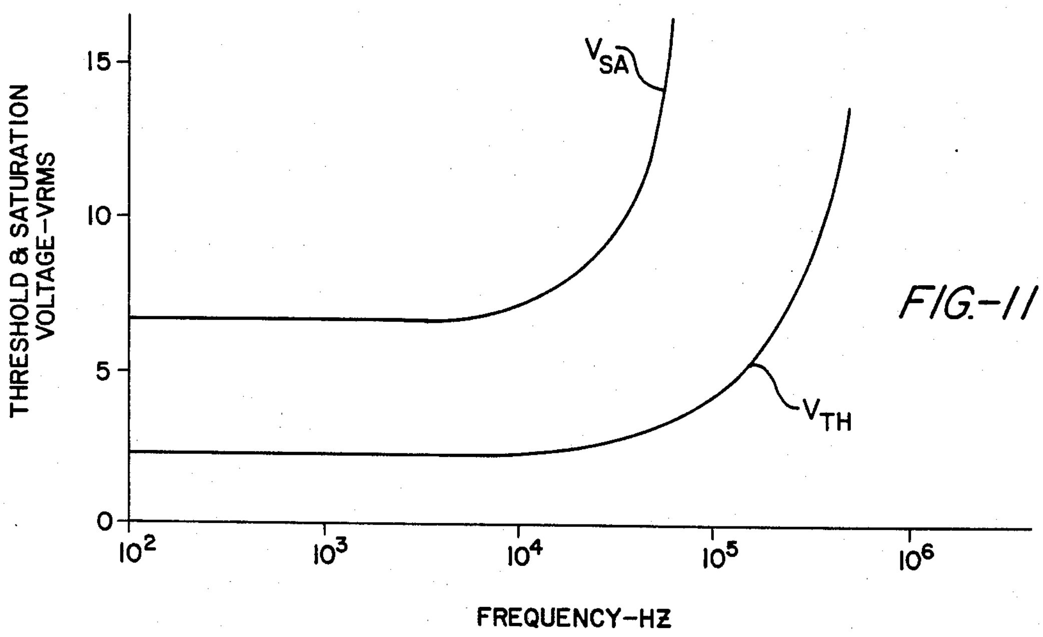
FIG. 11 is a chart showing a typical liquid crystal threshold and saturation RMS voltage characteristic as a function of frequency.

It is readily apparent from the foregoing that adjustment to any of the amplitude values of V1 through V4 may be utilized to position operation in the optimum range of FIG. 8. In the event some pair of points for operation such as points E and F in FIG. 8 are chosen for some reason to be the desired operating points for the display, $V_{SA}$ and $V_{TH}$ may be adjusted in the following fashion. FIG. 11 shows threshold and saturation voltages in RMS values for a particular liquid crystal display as a function of frequency. Since the aforementioned capacitance characteristics in the liquid cyrstal display may be controlled in fabrication, a display having known capacity may be produced, and saturation and threshold voltages for the particular liquid crystal display adjusted by adjusting the frequency of actuating voltage −V2. VRMS ON is then selected to exceed the saturation voltage and VRMS OFF is selected to be less than the threshold voltage. FIG. 11 shows that a higher VRMS value is required for both $V_{SA}$ and $V_{TH}$ as frequency rises. The impedance of the liquid crystal display falls as frequency rises due to the display capacitance characteristics. The semi-log chart of FIG. 11 shows frequency on the log scale and frequency values are for the purpose of providing example only. As shown therein $V_{SA}$ and $V_{TH}$ are relatively constant out to a value of approximately 10KHZ. Both values increase as liquid crystal display impedance decreases due to the necessity for a higher effective voltage value to maintain a required field strength within the liquid crystal material in the display. Variation in frequency between about 10KHZ and 50KHZ will provide for a considerable swing in both $V_{SA}$ and $V_{TH}$.

Figure 10:
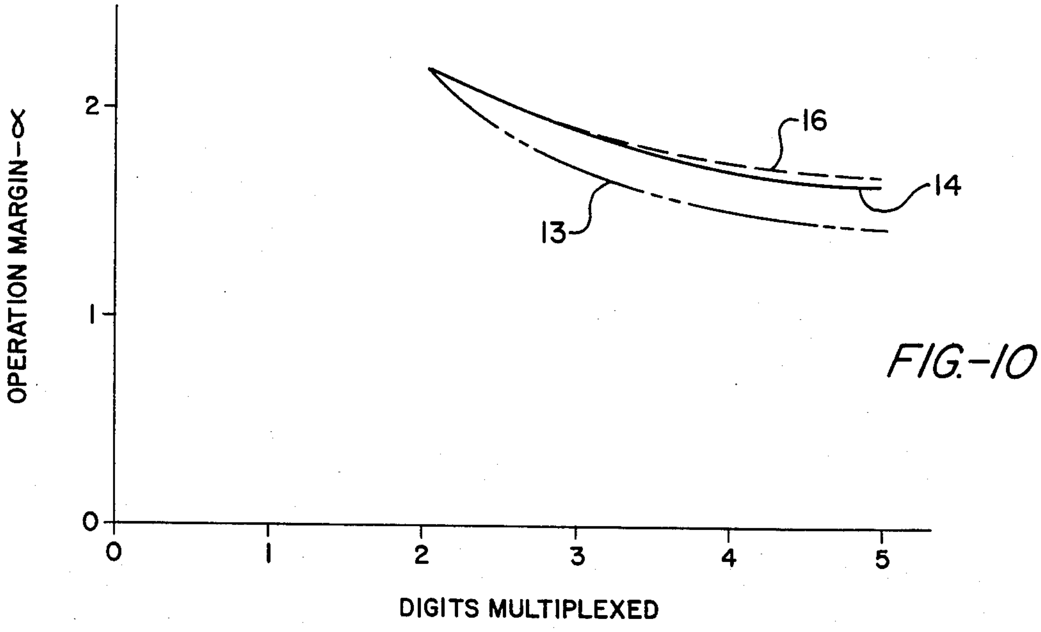
FIG. 10 is a chart showing operation margin as a function of the number of digits multiplexed in a display.

FIG. 10 shows a curve 13 which depicts operation margin as a function of the number of digits multiplexed in the display for the circuit of FIG. 1. Curve 14 in FIG. 10 shows operation margin as a function of digits multiplexed in the display for the circuit of FIG. 2. Curve 16 shows operation margin as a function of Digits multiplexed in the display for the disclosed invention. A driver circuit for a liquid crystal digital display has been disclosed which provides for a high operation margin, allowing relaxed source voltage regulation, while maintaining maximum contrast display and minimum ghost images. The advantages of the present invention displayed in part by curve 16 in FIG. 10 are obtained while decreasing the complexity of the circuit compared to the driver circuit of FIG. 2. Actuating voltage is adjusted in amplitude or frequency or both to obtain optimum display characteristics. Digit and segment quiescent voltages may also be adjusted to obtain desired operation margin.

The circuit diagrams of FIGS. 3 and 4 show discrete field effect transistor components and associated circuitry. The scope of this invention is intended to include any form of field effect transistor, i.e. MOS or CMOS, and associated circuitry for obtaining the disclosed beneficial results.

What is claimed is:

1. A driver circuit for receiving decoded segment and digit drive signals for determining application of electrical potential between predetermined segment and digit electrodes having liquid crystal material disposed therebetween to thereby form a liquid crystal display, said liquid crystal material operating to provide maximum contrast between areas underlying energized segment electrodes and surrounding areas when RMS voltage between segment and digit electrodes is at or above a saturating voltage and no contrast between such areas when RMS voltage therebetween is below a threshold voltage, said liquid crystal display having an upper cut-off frequency related to display capacitive characteristic, comprising a digit driver for each digit in the display for switching an enabling signal to the predetermined digit electrode responsive to the decoded digit drive signal, a segment driver for each segment in the digit for switching an actuating signal to the predetermined segment electrodes responsive to the decoded segment drive signals, said actuating signal having a frequency below the upper cutoff frequency and a polarity opposite from the polarity of said enabling signal, one like segment electrode in each digit being common with one like segment electrode in each other digit, whereby said decoded segment drive signal applies said actuating signal to all like segment electrodes simultaneously, said decoded digit drive signals operating to apply said enabling signal to said digit electrodes in sequence within a digit multiplexing cycle, said digit driver including means for applying a quiescent digit signal to said digit electrode in the absence of said digit drive signal, said segment driver including means for applying a quiescent segment signal to said segment electrodes in the absence of said segment drive signal, means for adjusting the amplitude of said actuating signal, so that the RMS value of the difference between said enabling and actuating signals during one digit multiplexing cycle at an actuated segment is greater than said saturation voltage, and means for adjusting the amplitude of said quiescent segment signal, so that the RMS value of the difference between said digit and segment quiescent signals during one digit multiplexing cycle at a quiescent segment is less than said threshold voltage, whereby maximum contrast appears in the display at actuated segments and ghost displays at quiescent segments are eliminated.

2. A driver circuit as in claim 1 together with additional means included in said digit driver for adjusting the amplitude of said digit quiescent signal, so that the RMS value of the difference between said digit and segment quiescent signals at a quiescent segment during one digit multiplexing cycle is less than said threshold voltage.

3. A driver circuit as in claim 1 wherein said digit driver comprises a field effect transistor having a gate, source, and drain, with said gate connected to receive said digit drive signal, and wherein said means for applying a quiescent digit signal comprises a resistor connected to said drain.

4. A driver circuit as in claim 1 wherein said digit driver comprises a first field effect transistor having a gate, source and drain, with said gate of said first field effect transistor connected to receive said digit drive signal and providing a low impedance path between source and drain responsive thereto, said means for applying a quiescent digit signal comprises a second field effect transistor having a gate, source and drain, with said gate of said second field effect transistor connected to receive said digit drive signal and providing a low impedance path between source and drain responsive thereto, together with a third field effect transistor having a gate, source and drain, with said gate of said third field effect transistor connected to said drain of second field effect transistor, said third field effect transistor providing a low impedance path between source and drain when second field effect transistor source-drain impedance is high, said first field effect transistor having its drain connected to one of said digit electrodes and its source connected to said enabling signal.

5. A driver circuit as in claim 1 wherein said segment driver further includes a first field effect transistor having a gate, source and drain, with said gate of said first field effect transistor connected to receive said segment drive signal and providing a low source-drain impedance path responsive thereto, said first field effect transistor drain being connected to said actuating signal and said source being connected to said segment electrodes, wherein said means for applying a quiescent segment signal comprises a second field effect transistor having a gate, source and drain, with said second field effect transistor source connected to said quiescent segment signal and said drain connected to said segment electrodes, said means for adjusting the amplitude of said actuating signal comprising a resistor connected to said first field effect transistor source,

6. A driver circuit as in claim 1 together with means for adjusting the frequency of said actuating signal, thereby adjusting liquid crystal impedance, whereby the RMS values of said saturation voltage and said threshold voltage required for on and off displays respectively is adjusted.

7. A driver circuit for receiving decoded segment and digit driver signals for providing application of electrical potential between predetermined segment and digit electrodes having liquid crystal material disposed therebetween for forming a liquid crystal display, said liquid crystal material having RMS saturation and threshold voltage characteristics and operating to provide maximum contrast between areas underlying energized segment electrodes and surrounding areas when RMS voltage between segment and digit electrodes is at or above the saturation voltage and no contrast between such areas when RMS voltage therebetween is below the threshold voltage, said liquid crystal display having a predetermined capacitance between the segment and digit electrodes, comprising a digit driver for each digit in the display operating to apply an enabling signal to each digit electrode in sequence within a digit multiplexing cycle responsive to the decoded digit drive signal, a segment driver for each segment in the digit for applying an actuating signal to the predetermined segment electrodes responsive to the decoded segment drive signals, one like segment electrode in each digit being common with one like segment electrode in each other digit, whereby said decoded segment drive signal applies said actuating signal to all like segment electrodes simultaneously, said digit driver including means for applying a quiescent digit signal to said digit electrode in the absence of said digit drive signal, said segment driver including means for applying a quiescent segment signal to said segment electrodes in the absence of said segment drive signal, means connected to said segment driver for providing said actuating signal at a predetermined frequency, said predetermined frequency being lower than a cutoff frequency for said liquid crystal display determined by said predetermined capacitance, whereby the RMS saturation and threshold voltages are adjusted to match the liquid crystal characteristics by selection of said predetermined frequency to obtain an optimum ratio therebetween so that critical regulation of enabling and actuating signals is obviated while maintaining maximum contrast between displayed segments and maximum contrast between non-displayed segments.

8. A driver circuit as in claim 7 wherein said digit driver includes means for adjusting the amplitude of said digit quiescent signal, so that the RMS value of the difference between digit and segment quiescent signals during one digit multiplexing cycle is less than said threshold voltage.

9. A driver circuit as in claim 7 wherein said digit driver comprises a field effect transistor having a gate, source and drain, with said gate connected to receive said digit drive signal, and wherein said means for applying a quiescent digit signal comprises a resistor connected to said drain.

10. A driver circuit as in claim 7 wherein said digit driver comprises a first field effect transistor having a gate, source and drain, with said gate of said first field effect transistor connected to receive said digit drive signal and providing a low impedance path between source and drain responsive thereto, said means for applying a quiescent digit signal comprising a second field effect transistor having a gate, source and drain, with said gate of said second field effect transistor connected to receive said digit drive signal and providing a low impedance path between source and drain responsive thereto, together with a third field effect transistor having a gate, source and drain, with said gate of said third effect transistor connected to said drain of said second field effect transistor, said third field effect transistor providing a low impedance path between source and drain when second field effect transistor source-drain impedance is high, said first field effect transistor having its drain connected to one of said digit electrodes and its source connected to said enabling signal.

11. A driver circuit as in claim 7 wherein said segment driver comprises a first field effect transistor having a gate, source and drain, with said gate of said first field effect transistor connected to receive said segment driver signal and providing a low source-drain impedance path responsive thereto, said first field effect transistor drain being connected to said actuating signal and said source being connected to said segment electrodes, and wherein said means for applying a quiescent segment signal includes a second field effect transistor having a gate, source and drain, with said second field effect transistor source connected to said quiescent segment signal and said drain connected to said segment electrodes, together with a third field effect transistor having a gate, source and drain, with said third field effect transistor gate connected to receive said segment drive signal and said drain connected to said second field effect transistor gate for controlling impedance between said second field effect transistor source and drain.

12. A driver circuit as in claim 7 together with additional means for adjusting the amplitude of said actuating signal included in said segment driver, so that the RMS value of the difference between said enabling and actuating signals during one digit multiplexing cycle is greater than said saturation voltage at energized segments and less than said threshold voltage at unenergized segments in the display.

13. A driver circuit as in claim 7 together with additional means for adjusting the amplitude of said enabling signal included in said digit driver, so that the RMS value of the difference between said enabling and actuating signals during one digit multiplexing cycle is greater than said saturation voltage at energized segments and less than said threshold voltage at unenergized segments in the display.

14. A driver circuit as in claim 7 together with additional means for adjusting the amplitude of said quiescent digit signal included in said digit driver, so that the RMS value of the difference of electrical potential between an unenabled digit electrode and the segment electrodes during one digit multiplexing cycle is less than said threshold voltage of the display.

15. A driver circuit as in claim 7 together with additional means for adjusting the amplitude of said quiescent segment signal included in said segment driver, so that the RMS value of the difference of electrical potential between an unactuated segment electrode and the digit electrode during one digit multiplexing cycle is less than said threshold voltage of the display.

* * * * *